(12) United States Patent
Kitano et al.

(10) Patent No.: US 11,050,890 B1
(45) Date of Patent: Jun. 29, 2021

(54) MEDIUM CONVEYING APPARATUS FOR DETERMINING CONVEYANCE ABNORMALITY BASED ON IMAGES ACQUIRED BY CHANGING BACKING MEMBER

(71) Applicant: PFU LIMITED, Kahoku (JP)

(72) Inventors: Hiroyuki Kitano, Kahoku (JP); Ken Funaki, Kahoku (JP); Tomoyuki Niwata, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/083,119

(22) Filed: Oct. 28, 2020

(30) Foreign Application Priority Data

Dec. 19, 2019 (JP) .............................. JP2019-229644

(51) Int. Cl.
*H04N 1/00* (2006.01)

(52) U.S. Cl.
CPC ..... *H04N 1/00092* (2013.01); *H04N 1/00005* (2013.01); *H04N 1/00013* (2013.01); *H04N 1/00029* (2013.01); *H04N 1/0057* (2013.01); *H04N 1/00663* (2013.01); *H04N 1/00737* (2013.01); *H04N 1/00745* (2013.01)

(58) Field of Classification Search
CPC ........... H04N 1/00005; H04N 1/00013; H04N 1/00029; H04N 1/00037; H04N 1/0005; H04N 1/00092; H04N 1/0057; H04N 1/00588; H04N 1/00591; H04N 1/00663; H04N 1/00737; H04N 1/00745; H04N 1/00758; H04N 1/00774; H04N 1/00681–00726
See application file for complete search history.

(56) References Cited

U.S. PATENT DOCUMENTS

2021/0058519 A1* 2/2021 Shiota .................. H04N 1/0071

FOREIGN PATENT DOCUMENTS

JP 2006-186716 A 7/2006

* cited by examiner

*Primary Examiner* — Scott A Rogers
(74) *Attorney, Agent, or Firm* — Lewis Roca Rothgerber Christie LLP

(57) ABSTRACT

A medium conveying apparatus includes a conveyance roller to convey a medium, an imaging sensor, a backing member including an opposing surface, a motor to switch the backing member between an opposing position in which the opposing surface faces the imaging sensor and a non-opposing position in which the opposing surface is deviated from the opposing position, a medium sensor located on an upstream side of the imaging sensor in a medium conveying direction, and a processor to acquire a first image captured by locating the opposing surface in the opposing position and a second image captured by locating the opposing surface in the non-opposing position after a front end of the medium conveyed by the conveyance roller passes through a position of the medium sensor, and determine whether a conveyance abnormality of the medium has occurred based on the first image and the second image.

12 Claims, 13 Drawing Sheets

MEDIUM CONVEYING APPARATUS FOR DETERMINING CONVEYANCE ABNORMALITY BASED ON IMAGES ACQUIRED BY CHANGING BACKING MEMBER

CROSS-REFERENCE TO RELATED APPLICATIONS

This application is based upon and claims the benefit of priority of prior Japanese Patent Application No. 2019-229644, filed on Dec. 19, 2019, the entire contents of which are incorporated herein by reference.

TECHNICAL FIELD

Embodiments discussed in the present specification relate to medium conveyance.

BACKGROUND

In a medium conveying apparatus such as a scanner, a conveyance abnormality such as or a jam (paper jam) may occur when a medium moves in a conveyance path. The medium conveying apparatus needs to accurately determine whether or not a medium conveyance abnormality has occurred in order to stop the medium conveyance to prevent damaging to the medium when the medium conveyance abnormality occurs.

A document reading apparatus to discriminate a jam based on a change in image data read by an image reading unit is disclosed (Japanese Unexamined Patent Publication (Kokai) No. 2006-186716). The document reading apparatus compares the image data before and after, and determines that a jam has occurred when there is no change in the image data, or when the difference in the pixel values of the image data is equal to or less than a predetermined value, etc.

SUMMARY

According to some embodiments, a medium conveying apparatus includes a conveyance roller to convey a medium, an imaging sensor, a backing member including an opposing surface, a motor to switch the backing member between an opposing position in which the opposing surface faces the imaging sensor and a non-opposing position in which the opposing surface is deviated from the opposing position, a medium sensor located on an upstream side of the imaging sensor in a medium conveying direction, and a processor to acquire a first image captured by locating the opposing surface in the opposing position and a second image captured by locating the opposing surface in the non-opposing position after a front end of the medium conveyed by the conveyance roller passes through a position of the medium sensor, and determine whether a conveyance abnormality of the medium has occurred based on the first image and the second image.

According to some embodiments, a method for controlling conveying a medium includes conveying a medium by a conveyance roller, switching a backing member including an opposing surface between the opposing position in which the opposing surface faces an imaging sensor and a non-opposing position in which the opposing surface is deviated from the opposing position by a motor, acquiring a first image captured by locating the opposing surface in the opposing position and a second image captured by locating the opposing surface in the non-opposing position after a front end of the medium conveyed by the conveyance roller passes through a position of a medium sensor located on an upstream side of the imaging sensor in a medium conveying direction, and determining whether a conveyance abnormality of the medium has occurred based on the first image and the second image.

According to some embodiments, a computer-readable, non-transitory medium stores a computer program. The computer program causes a medium conveying apparatus including a conveyance roller to convey a medium, an imaging sensor, a backing member including an opposing surface, a motor to switch the backing member between an opposing position in which the opposing surface faces the imaging sensor and a non-opposing position in which the opposing surface is deviated from the opposing position, a medium sensor located on an upstream side of the imaging sensor in a medium conveying direction, to execute a process including acquiring a first image captured by locating the opposing surface in the opposing position and a second image captured by locating the opposing surface in the non-opposing position after a front end of the medium conveyed by the conveyance roller passes through a position of the medium sensor, and determining whether a conveyance abnormality of the medium has occurred based on the first image and the second image.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus, a method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
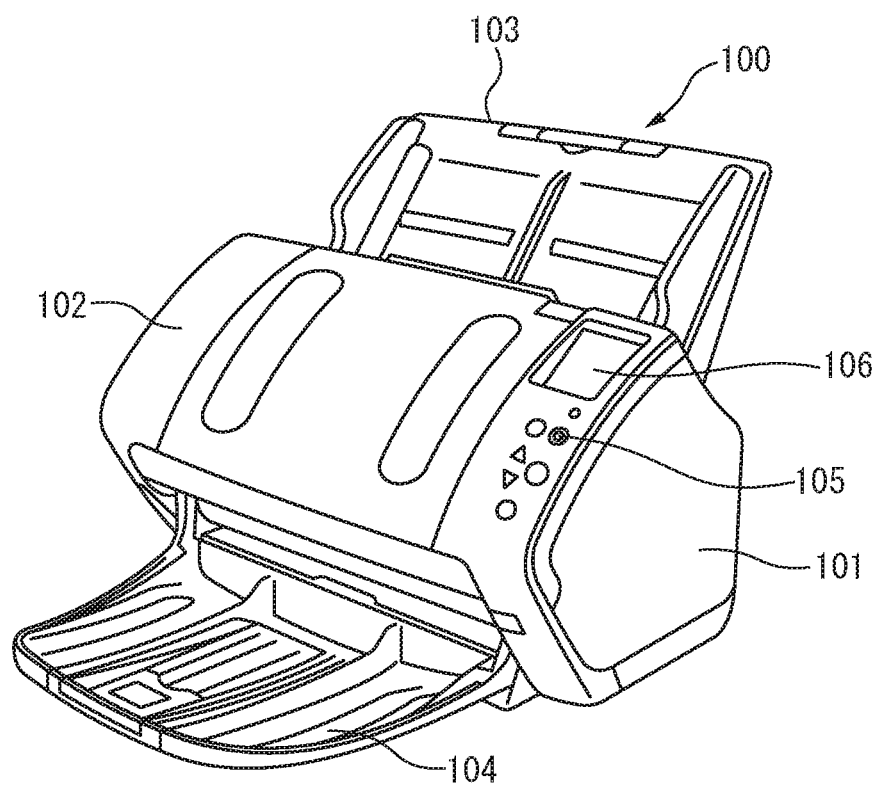
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a card, a brochure, a passport, etc. The medium conveying apparatus 100 may be a fax machine, a copying machine, a multifunctional peripheral (MFP), etc. A conveyed medium may not be a document but may be an object being printed on etc., and the medium conveying apparatus 100 may be a printer etc.

The medium conveying apparatus 100 includes a lower housing 101, an upper housing 102, a medium tray 103, an ejection tray 104, an operation device 105, and a display device 106.

The upper housing 102 is located at a position covering the upper surface of the medium conveying device 100 and is engaged with the lower housing 101 by hinges so as to be opened and closed at a time of medium jam, during cleaning the inside of the medium conveying device 100, etc.

The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
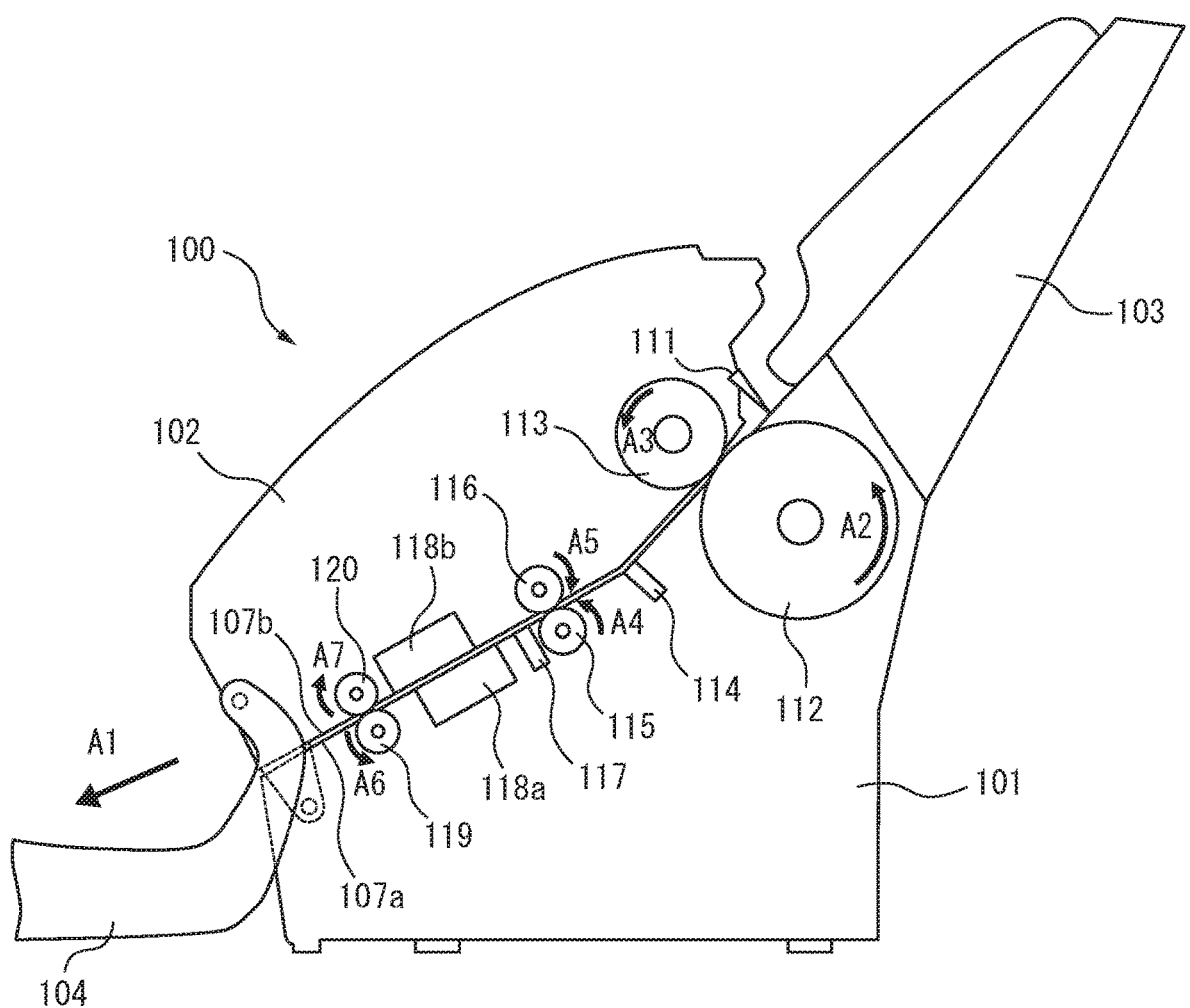
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying device 100 includes a first sensor 111, a feed roller 112, a brake roller 113, a second sensor 114, a first conveyance roller 115, a second conveyance roller 116, a third sensor 117, a first imaging device 118a, a second imaging device 118b, a third conveyance roller 119 and a fourth conveyance roller 120, etc. The numbers of each roller is not limited to one, and may be plural. The first imaging device 118a and the second imaging device 118b may be collectively referred to as imaging devices 118.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first sensor 111 is located on an upstream side of the feed roller 112 and the brake roller 113. The first sensor 111 includes a contact detection sensor and detects whether or not a medium is placed on the medium tray 103. The first sensor 111 generates and outputs a first medium signal whose signal value changes between a state in which a medium is placed on the medium tray 103 and a state in which a medium is not placed.

The feed roller 112 is provided on the lower housing 101 and sequentially feed media placed on the medium tray 103 from the lower side. The brake roller 113 is provided on the upper housing 102 and located to face the feed roller 112.

A medium placed on the medium tray 103 is conveyed between the lower guide 107a and the upper guide 107b in the medium conveying direction A1 by the feed roller 112 rotating in a direction of an arrow A2 in FIG. 2, that is, a medium feeding direction. When a medium is conveyed, the brake roller 113 rotates in a direction of an arrow A3, that is, a direction opposite to the medium feeding direction. By the workings of the feed roller 112 and the brake roller 113, when a plurality of media are placed on the medium tray 103, only a medium in contact with the feed roller 112, out of the media placed on the medium tray 103, is separated. Consequently, the medium conveying apparatus 100 operates in such a way that conveyance of a medium other than the separated medium is restricted (prevention of multifeed).

The medium is fed between the first conveyance roller 115 and the second conveyance roller 116 while being guided by the lower guide 107a and the upper guide 107b. The medium is fed between the first imaging device 118a and the second imaging device 118b by the first conveyance roller 115 and the second conveyance roller 116 rotating in directions of an arrow A4 and an arrow A5, respectively. The first conveyance roller 115 and the second conveyance roller 116 are examples of a conveyance roller to convey the medium fed by the feed roller 112 to the imaging device 118. The medium read by the imaging devices 117 is ejected on the ejection tray 104 by the third conveyance roller 119 and the fourth conveyance roller 120 rotating in directions of an arrow A6 and an arrow A7, respectively.

Figure 3:
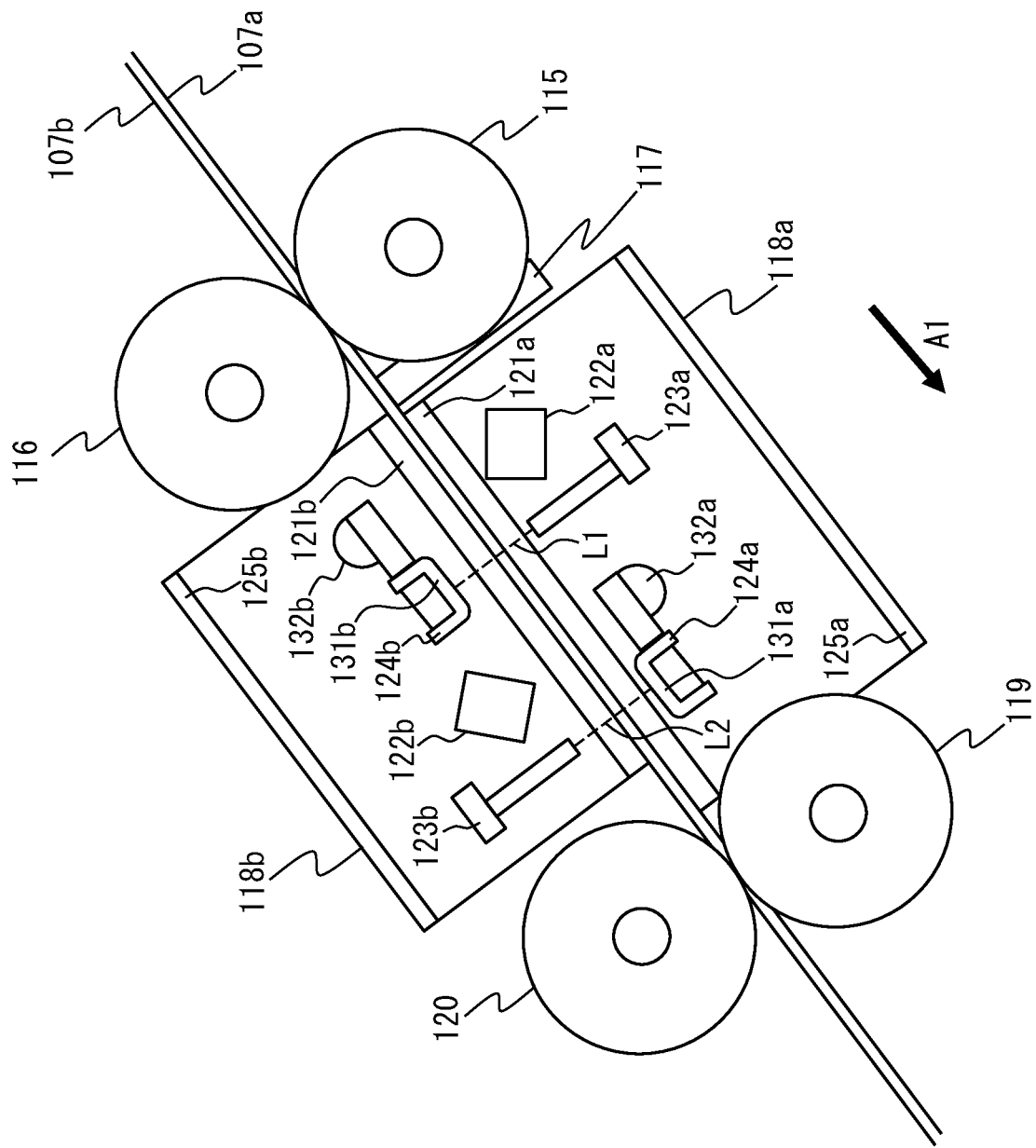
FIG. 3 is a diagram for illustrating the imaging device 118.
Figure 4:
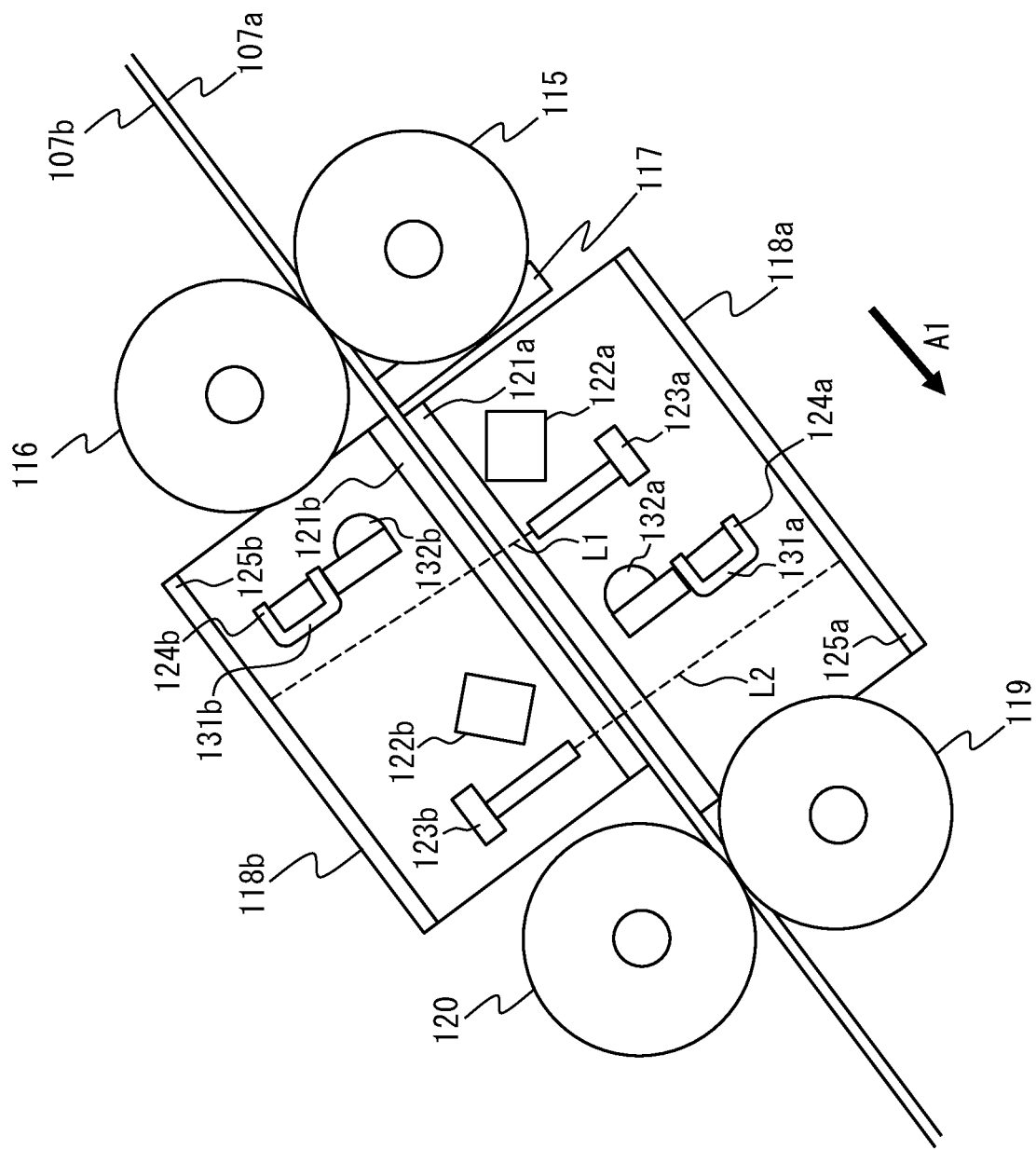
FIG. 4 is a diagram for illustrating the imaging device 118.

FIGS. 3 and 4 are diagrams for illustrating the imaging device the imaging device 118.

As shown in FIGS. 3 and 4, the second imaging device 118b is located above the first imaging device 118a so as to face the first imaging device 118a. The first imaging device 118a includes a first light transmitting member 121a, a first light source 122a, a first imaging sensor 123a, a first backing member 124a and a first wall member 125a, etc. The second imaging device 118b includes a second light transmitting member 121b, a second light source 122b, a second imaging sensor 123b, a second backing member 124b and a second wall member 125b, etc.

The first light transmitting member 121a and the second light transmitting member 121b are formed of transparent glass. The first light transmitting member 121a and the second light transmitting member 121b may be formed of transparent plastic, etc.

The first light source 122a is provided on the opposite side of the second backing member 124b with the first light transmitting member 121a and the second light transmitting member 121b in between. The first light source 122a includes a Light Emitting Diode (LED). The first light source 122a irradiates light toward a front surface of the medium conveyed to the position of the imaging device 118, that is, toward the second backing member 124b or the second wall member 125b of the second imaging device 118b which faces the first light source 122a when the medium is not conveyed.

Similarly, the second light source 122b is provided on the opposite side of the first backing member 124a with the second light transmitting member 121b and the first light transmitting member 121a in between. The second light source 122b includes an LED. The second light source 122b irradiates light toward a back surface of the medium conveyed to the position of the imaging device 118, that is, toward the first backing member 124a or the first wall member 125a of the first imaging device 118a which faces the second light source 122b when the medium is not conveyed.

The first imaging sensor 123a is an example of an imaging sensor, and is provided on the opposite side of the second backing member 124b with the first light transmitting member 121a and the second light transmitting member 121b in between. The first imaging sensor 123a includes a line sensor based on a unity-magnification optical system type contact image sensor (CIS) including an imaging element based on a complementary metal oxide semiconductor (CMOS) linearly located in a main scanning direction. Further, the first imaging sensor 123a includes a lens for forming an image on the imaging element, and an A/D converter for amplifying and analog-digital (AD) converting an electric signal output from the imaging element. The first imaging sensor 123a images the front surface of the conveyed medium and the periphery of the medium at the imaging position L1. The first imaging sensor 123a sequentially generates and outputs line image acquired by imaging an area of a conveyed medium facing the line sensor, at certain intervals. Specifically, a pixel count of a line image in a vertical direction (subscanning direction) is 1, and a pixel count in a horizontal direction (main scanning direction) is larger than 1.

Similarly, the second imaging sensor 123b is an example of an imaging sensor, and is provided on the opposite side of the first backing member 124a with the first light transmitting member 121a and the second light transmitting member 121b in between. The second imaging sensor 123b includes a line sensor based on a unity-magnification optical system type CIS including an imaging element based on a CMOS linearly located in a main scanning direction. Further, the second imaging sensor 123b includes a lens for forming an image on the imaging element, and an A/D converter for amplifying and A/D converting an electric signal output from the imaging element. The second imaging sensor 123b images the back surface of the conveyed medium and the periphery of the medium at the imaging position L2. The second imaging sensor 123b sequentially generates and outputs line image acquired by imaging an area of a conveyed medium facing the line sensor, at certain intervals.

A line sensor based on a unity-magnification optical system type CIS including an imaging element based on charge coupled devices (CCDs) may be used in place of the line sensor based on a unity-magnification optical system type CIS including an imaging element based on a CMOS. Further, a line sensor based on a reduction optical system type line sensor including an imaging element based on CMOS or CCDs. In addition, any one of a set of the first light source 122a, the first imaging sensor 123a, the second backing member 124b and the second wall member 125b, or a set of the second light source 122b, the second imaging sensor 123b, the first backing member 124a and the first wall member 125a may be omitted.

The first backing member 124a is provided below the first light transmitting member 121a and at a position facing the second light source 122b and the second imaging sensor 123b. The first backing member 124a has a first opposing surface 131a facing the second imaging sensor 123b. The first opposing surface 131a has, for example, white, and functions as a white reference member for correcting an image such as shading based on an image signal in which the first opposing surface 131a is captured. The first opposing surface 131a has a color other than black. The first opposing surface 131a may have a color other than white. The first backing member 124a is rotatably supported by the first support member 132a, and is rotated by a driving force from a second motor which will be described later. The first backing member 124a is switched between an opposing position (the position shown in FIG. 3) in which the first opposing surface 131a faces the second imaging sensor 123b and a non-opposing position (the position shown in FIG. 4) in which the first opposing surface 131a is deviated from the opposing position by a driving force from the second motor.

Similarly, the second backing member 124b is provided above the second light transmitting member 121b and at a position facing the first light source 122a and the first imaging sensor 123a. The second backing member 124b has a second opposing surface 131b facing the first imaging sensor 123a. The second opposing surface 131b has, for example, white, functions as a white reference member for correcting an image such as shading based on an image signal second in which the second facing surface 131b is captured. The second opposing surface 131b has a color other than black. The second opposing surface 131b may have a color other than white. The second backing member 124b is rotatably supported by the second support member 132b is rotated by a driving force from the second motor. The second backing member 124b is switched between an opposing position (the position shown in FIG. 3) in which the second opposing surface 131b faces the first imaging sensor 123a and a non-opposing position (the position shown in FIG. 4) in which the second opposing surface 131b is deviated from the opposing position by a driving force from the second motor.

The first wall member 125a is provided at a position facing the second imaging sensor 123b when the first backing member 124a is located at the non-opposing position. The surface of the first wall member 125a facing the second imaging sensor 123b has a color different from the first opposing surface 131a such as black.

Similarly, the second wall member 125b is provided at a position facing the first imaging sensor 123a when the second backing member 124b is located at a non-opposing position. The surface of the second wall member 125b facing the first imaging sensor 123a has a color different from that of the second opposing surface 131b such as black.

Hereinafter, the first light transmitting member 121a and the second light transmitting member 121b may be collectively referred to as light transmitting members 121. The first light source 122a and the second light source 122b may be collectively referred to as light sources 122. The first imaging sensor 123a and the second imaging sensor 123b may be collectively referred to as imaging sensors 123. The first backing member 124a and the second backing member 124b may be collectively referred to as backing members 124. The first wall member 125a and the second wall member 125b may be collectively referred to as wall members 125. The first opposing surface 131a and the second opposing surface 131b may be collectively referred to as opposing surfaces 131.

When the backing member 124 is located at the opposing position as shown in FIG. 3, the light emitted from the light source 122 is reflected by the opposing surface 131 of the backing member 124 to image the imaging sensor 123, in the region where the medium is not present. In the image based on the image signal generated at this time, the pixel corresponding to the region where the medium is not present has a white color. On the other hand, when the backing member 124 is located at a non-opposing position as shown in FIG. 4, the light emitted from the light source 122 is reflected by the wall member 125, and images the imaging sensor 123. In the image based on the image signal generated at this time, the pixel corresponding to the region where the medium is not present has a black color.

Figure 5:
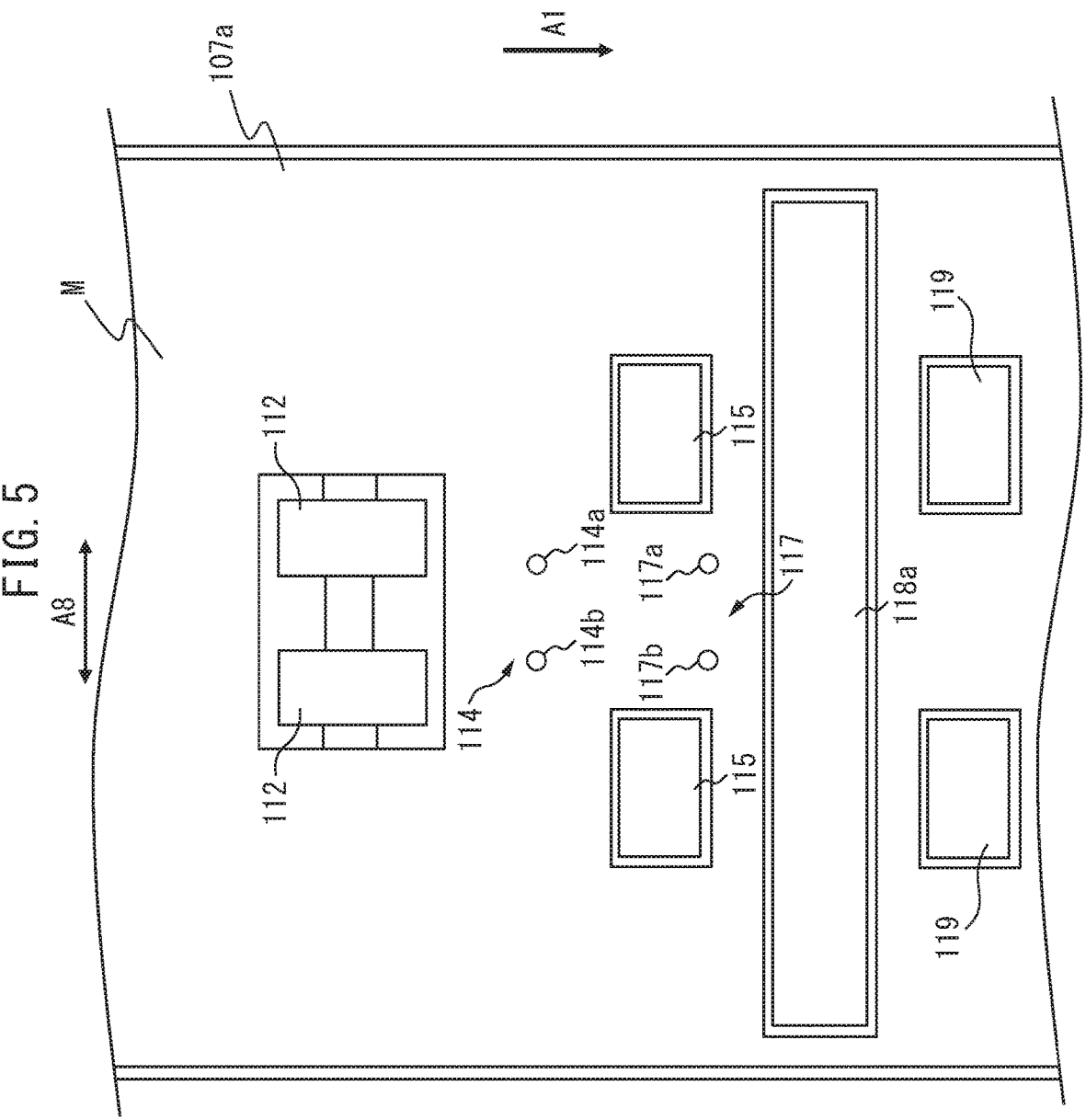
FIG. 5 is a diagram for illustrating the third sensor 117, etc.

FIG. 5 is a schematic diagram for illustrating the second sensor 114 and the third sensor 117. FIG. 5 is a schematic diagram of the lower housing 101 viewed from above in a state where the upper housing 102 is removed.

As shown in FIG. 5, the second sensor 114 is located on the downstream side of the feed roller 112 and the brake-roller 113 and on the upstream side of the first conveyance roller 115 and the second conveyance roller 116 in the medium conveying direction A, and at a substantially central portion in a direction A8 perpendicular to the medium conveying direction. The second sensor 114 includes a second light emitter 114a and a second light receiver 114b provided on one side (the lower housing 101) relative to the medium conveyance path. The second sensor 114 includes a second reflection member (not shown) such as a mirror provided at a position (the upper housing 102) facing the second light emitter 114a and the second light receiver 114b with the medium conveyance path in between. The second light emitter 114a irradiates light toward the medium conveyance path. On the other hand, the second light receiver 114b receives the light irradiated by the second light emitter 114a and reflected by the second reflection member, and generates and outputs a second medium signal which is an electric signal corresponding to the intensity of the received light.

The third sensor 117 is an example of a medium sensor, and is located on the downstream side of the first conveyance roller 115 and the second conveyance roller 116 and on the upstream side of the imaging device 118 in the medium conveying direction A1, and at a substantially central portion in a direction A8 perpendicular to the medium conveying direction. The third sensor 117 includes a third light emitter 117a and a third light receiver 117b provided on one side (the lower housing 101) of the medium conveyance path. The third sensor 117 includes a third reflecting member (not shown) such as a mirror provided at a position (the upper housing 102) facing the third light emitter 117a and the third light receiver 117b with the medium conveyance path in between. The third light emitter 117a irradiates light toward the medium conveyance path. On the other hand, the third light receiver 117 receives the light irradiated by the third light emitter 117a and reflected by the second reflection member, and generates and outputs a third medium signal which is an electric signal corresponding to the intensity of the received light.

When a medium exists at each position of the second sensor 114 and the third sensor 117, the light illuminated by the light emitters of each sensor is shielded by the medium. Accordingly, a signal value of a signal generated by each sensor varies between a state in which a medium exists at a position of each sensor and a state in which a medium does not exist. Thus, the second sensor 114 and the third sensor 117 detects whether or not the medium exists at the position, to detect the fed medium. The light emitter and the light receiver in each sensor may be provided in positions facing one another with the conveyance path in between, and the reflection member may be omitted.

Figure 6:
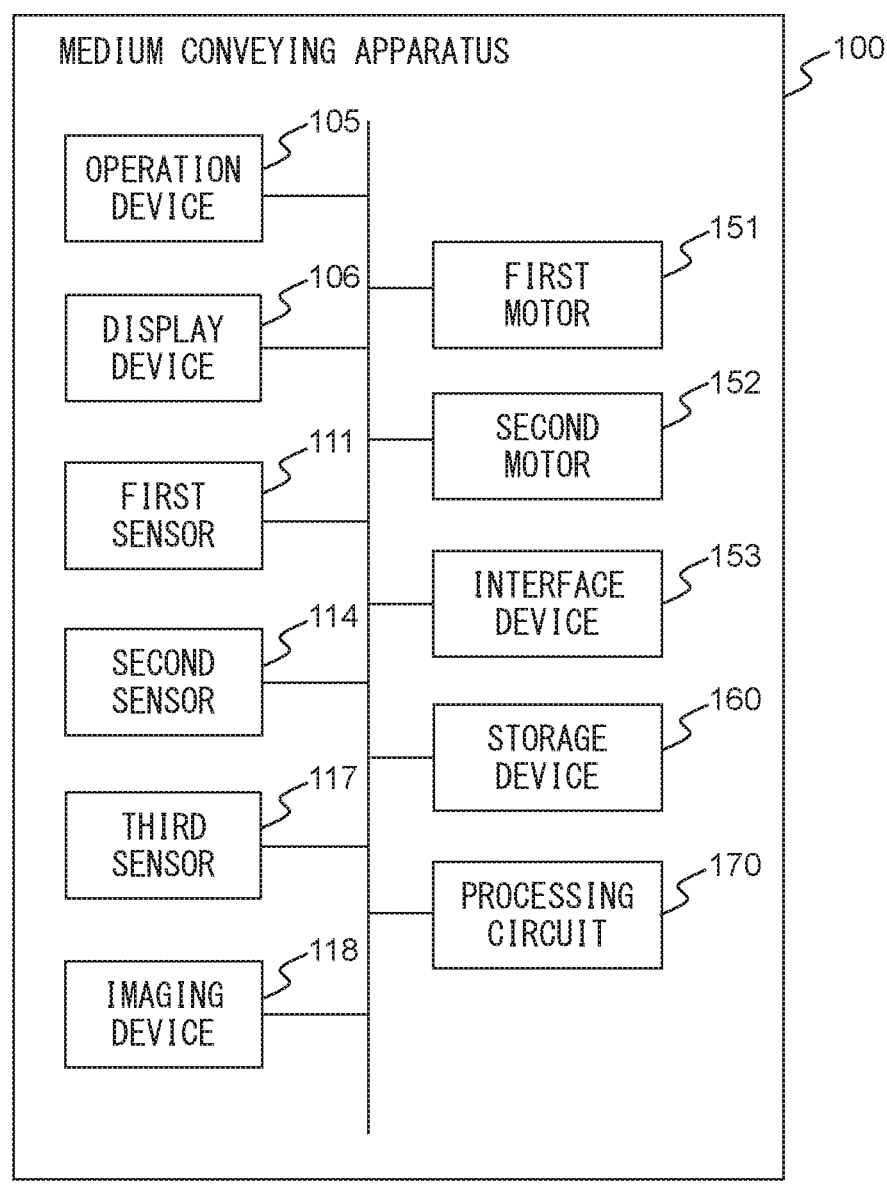
FIG. 6 is a block diagram illustrating a schematic configuration of the medium conveying apparatus 100.

FIG. 6 is a block diagram illustrating a schematic configuration of the medium conveying apparatus 100.

The medium conveying apparatus 100 further includes a first motor 151, a second motor 152, an interface device 153, a storage device 160, a processing circuit 170, etc., in addition to the configuration described above.

The first motor 151 includes one or more motors, and rotates the feed roller 112, the brake roller 113, and the first to fourth conveyance rollers 115, 116, 119, and 120 to convey the medium by a control signal from the processing circuit 170.

The second motor 152 is an example of a motor, includes one or more motors, and switches the backing member 124 between the opposing position and the non-opposing position, by a control signal from the processing circuit 170.

For example, the interface device 153 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 153. For example, the predetermined communication protocol is a wireless local area network (LAN).

The storage device 160 includes a memory device such as a random access memory (RAM) or a read only memory (ROM), a fixed disk device such as a hard disk, or a portable storage device such as a flexible disk or an optical disk. Further, the storage device 160 stores a computer program, a database, a table, etc., used for various types of processing in the medium conveying apparatus 100. The computer program may be installed on the storage device 160 from a computer-readable, non-transitory medium such as a compact disc read only memory (CD-ROM), a digital versatile disc read only memory (DVD-ROM), etc., by using a well-known setup program, etc.

The processing circuit 170 operates in accordance with a program previously stored in the storage device 160. The processing circuit 170 is, for example, a CPU (Central Processing Unit). The processing circuit 170 may be a digital signal processor (DSP), a large scale integration (LSI), an application specific integrated circuit (ASIC), a field-programmable gate array (FPGA), etc.

The processing circuit 170 is connected to the operation device 105, the display device 106, the first sensor 111, the second sensor 114, the third sensor 117, the imaging device 118, the first motor 151, the second motor 152, the interface device 153 and the storage device 160, etc., and controls each of these units. The processing circuit 170, performs drive control of the first motor 151 and the second motor 152, and imaging control of the imaging device 118, etc., generates an input image, and transmits the input image to the information processing apparatus via the interface device 153. Further, the processing circuit 170 determines whether or not the conveyance abnormality of the medium has occurred based on the signal generated by the third sensor 117 and the imaging device 118, and controls the conveyance of the medium based on the determination result.

Figure 7:
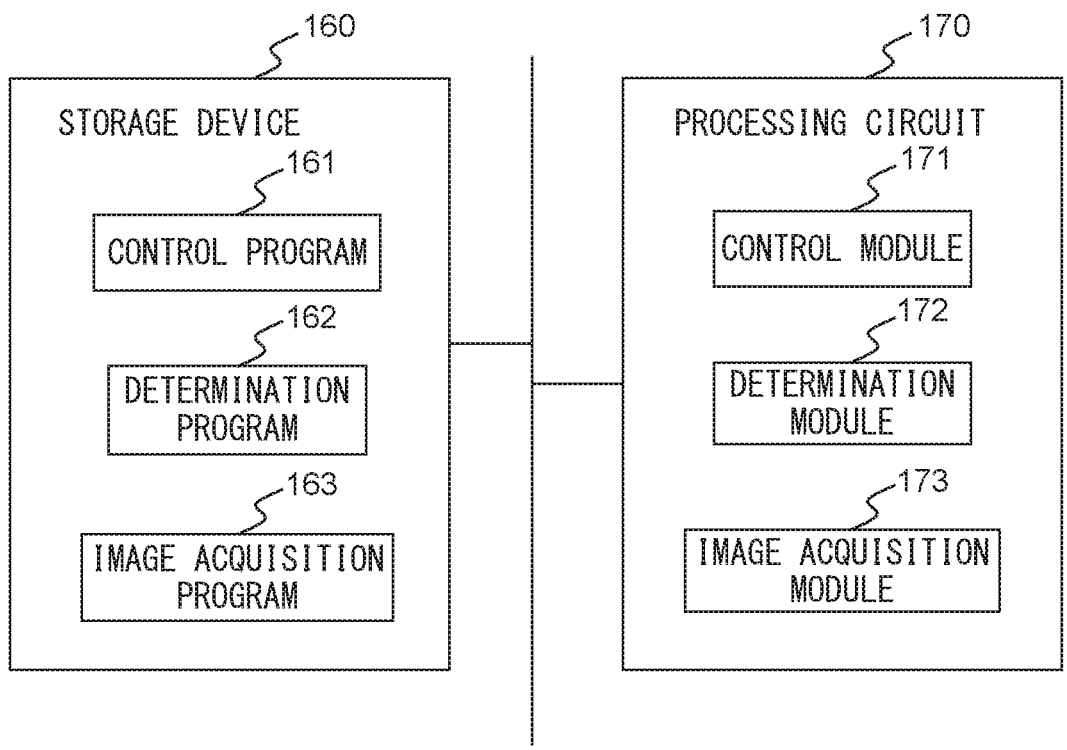
FIG. 7 is a diagram illustrating schematic configurations of a storage device 160 and a processing circuit 170.

FIG. 7 is a diagram illustrating schematic configurations of the storage device 160 and the processing circuit 170.

As illustrated in FIG. 7, a control program 161, a determination program 162, an image acquisition program 163, etc., are stored in the storage device 160. Each of these programs is a functional module implemented by software operating on a processor. The processing circuit 170 reads each program stored in the storage device 160 and operates in accordance with each read program. Thus, the processing circuit 170 functions as a control module 171, a determination module 172 and an image acquisition module 173.

Figure 8:
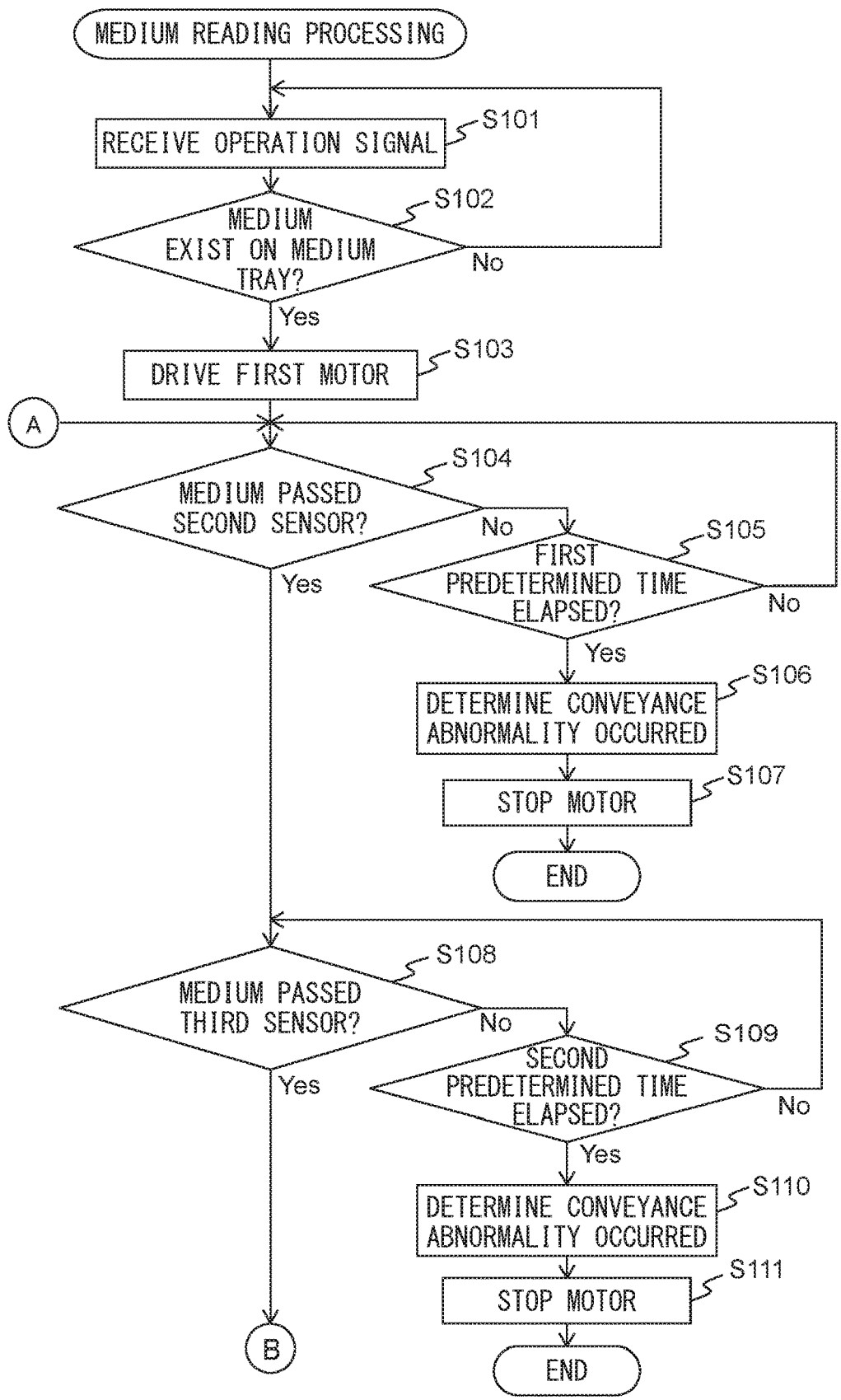
FIG. 8 is a flowchart illustrating an operation example of the medium reading processing.
Figure 9:
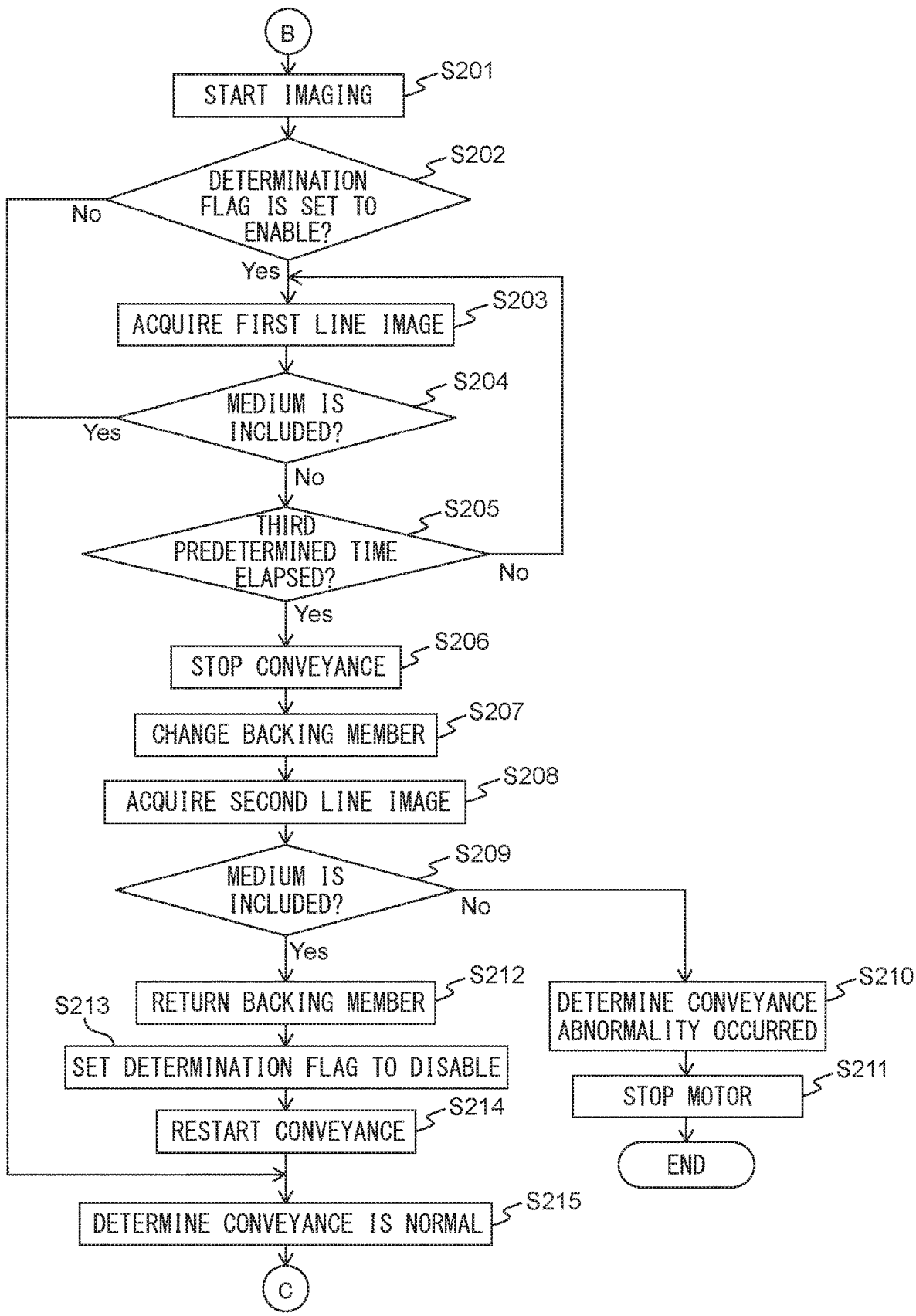
FIG. 9 is a flowchart illustrating an operation example of the medium reading processing.
Figure 10:
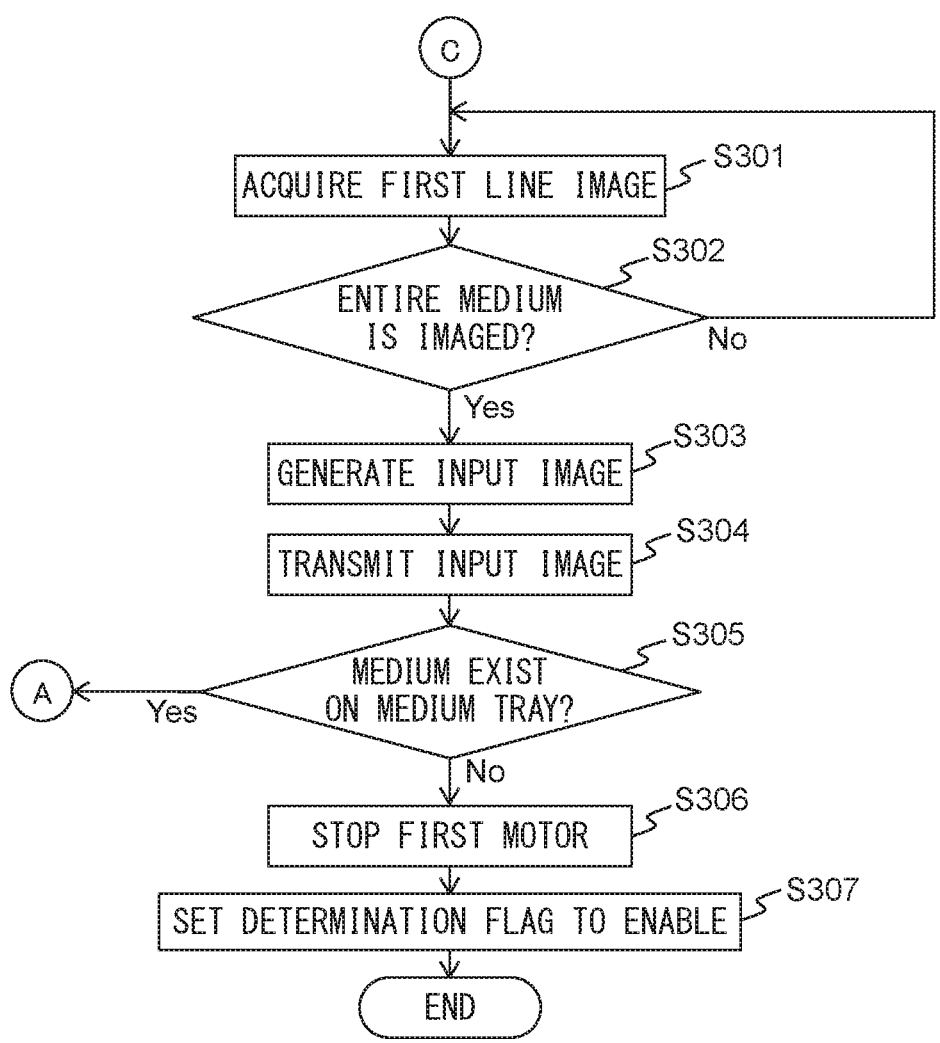
FIG. 10 is a flowchart illustrating an operation example of the medium reading processing.

FIGS. 8 to 10 are flowcharts illustrating an operation example of the medium reading processing of the medium conveying apparatus 100.

Referring to the flowchart illustrated in FIGS. 8 to 10, the operation example of the medium reading processing in the medium conveying apparatus 100 will be described below. The operation flow described below is executed mainly by the processing circuit 170 in cooperation with each element in the medium conveying apparatus 100, in accordance with a program previously stored in the storage device 160. The flow of operation shown in FIGS. 8 to 10 is executed periodically. Before the flow of operation shown in FIGS. 8 to 10 is performed, the opposing surface 131 of the backing member 124 is located at an initial setting position preset by a user among the opposing position or the non-opposing position.

First, the control module 171 stands by until an instruction to read a medium is input by a user by use of the operation device 105, and an operation signal instructing to read the medium is received from the operation device 105 (step S101).

Next, the control module 171 acquires the first medium signal from the first sensor 111 and determines whether or not the medium is placed on the medium tray 103 based on the acquired first medium signal (step S102).

When a medium is not placed on the medium tray 103, the control module 171 returns the processing to step S101 and stands by until newly receiving an operation signal from the operation device 105.

On the other hand, when the medium is placed on the medium tray 103, the control module 171 drives the first motor 151. The control module 171 rotates the feed roller 112, the brake roller 113, and the first to fourth conveyance rollers 115, 116, 119, and 120 to feed and convey the medium (step S103).

Next, the determination module 172 determines whether or not a front end of the medium has passed through the position of the second sensor 114 (step S104). The determination module 172 acquires the second medium signal periodically from the second sensor 114 and determines whether or not the medium is present at the position of the second sensor 114 based on the acquired second medium signal. When a signal value of the second medium signal changes from a value indicating nonexistence of a medium to a value indicating existence of a medium, the determination module 172 determines that the front end of the medium has passed through the position of the second sensor 114.

When the front end of the medium has not passed through the position of the second sensor 114, the determination module 172 determines whether or not the first predetermined time has elapsed after the feeding of the medium is started (step S105). The first predetermined time is set to the time acquired by adding a margin to the time required for the front end of the medium to pass through the position of the second sensor 114 after the feeding of the medium is started, by a prior experiment. When the first predetermined time has not elapsed after the feeding of the medium is started, the determination module 172 returns the processing to step S104 and repeats the processing of step S104 to S105.

On the other hand, when the first predetermined time elapses after the feeding of the medium is started, the determination module 172 determines that a conveyance abnormality such as a conveyance stop due to a jam (paper jam) or a slip of the medium has occurred (step S106).

Next, the control module 171 stops the first motor 151 to stop the feeding and conveying of the medium (step S107), and ends the series of steps.

On the other hand, in the step S104, when the front end of the medium passes through the position of the second sensor 114, the determination module 172 determines whether the tip of the medium has passed through the position of the third sensor 117 (step S108). The determination module 172 acquires the third medium signal periodically from the third sensor 117, and determines whether or not the medium exists at the position of the third sensor 117 based on the acquired third medium signal. The determination module 172 determines that the front end of the medium has passed through the position of the third sensor 117 when the signal value of the third medium signal changes from a value indicating nonexistence of a medium to a value indicating existence of a medium.

When the front end of the medium has not passed through the position of the third sensor 117, the determination module 172 determines whether or not the second predetermined time has elapsed after the front end of the medium passes through the position of the second sensor 114 (step S109). The second predetermined time is set to a time acquired by adding a margin to the time required for the front end of the medium to pass through the position of the third sensor 117 after passing through the position of the second sensor 114, by a prior experiment. When the second predetermined time has not elapsed after the front end of the medium passes through the position of the second sensor 114, the determination module 172 returns the processing to step S108, and repeats the processing of step S108 to S109.

On the other hand, when the second predetermined time has elapsed after the front end of the medium passes through the position of the second sensor 114, the determination module 172 determines that a conveyance abnormality such as a conveyance stop due to a jam or slip of the medium has occurred (step S110).

Next, the control module 171 stops the first motor 151 to stop the feeding and conveying of the medium (step S111), and ends the series of steps.

On the other hand, in step S108, when the front end of the medium passes through the position of the third sensor 117, the image acquisition module 173 causes the imaging device 118 to start imaging (step S201).

Next, the determination module 172 determines whether or not the determination flag is set to enable or disable (step S202). The determination flag is a flag for executing a determination processing for determining whether or not the conveyance abnormality of the medium has occurred based on the first line image and the second line image for the second and subsequent medium. The determination flag is set to enabled at the start of the medium reading processing, and is set to disabled when it is determined that the conveyance abnormality has not occurred in the determination processing in step S203 to S214. When the determination flag is set to disable, the determination module 172 proceeds the processing to step S215 without executing the processing of step S203 to S214. In this case, the determination module 172 determines that the conveyance abnormality of the medium has not occurred and the conveyance is normal.

On the other hand, when the determination flag is set to enable, the image acquisition module 173 acquires the first line image from the imaging device 118 (step S203). In other words, the image acquisition module 173 acquires the first line image after the front end of the medium conveyed by the first conveyance roller 115 and the second conveyance roller 116 passes through the position of the third sensor 117. The first line image is a line image captured by locating the opposing surface 131 of the backing member 124 in the initial setting position among the opposing position or non-opposing position. When the opposing position is set as the initial setting position, the first line image is an example of the first image captured by locating the opposing surface 131 in the opposing position. On the other hand, when the non-opposing position is set as the initial setting position, the first line image is an example of a second image captured by locating the opposing surface 131 in the non-opposing position.

Next, the determination module 172 determines whether or not the medium is included in the first line image (step S204). The determination module 172 determines whether or not the medium is included in the first line image based on the gradation value of the pixel in the first line image corresponding to the position where the third sensor 117 is located in the direction A8 perpendicular to the medium conveying direction. The determination module 172 calculates the average value of the gradation values of the pixels corresponding to the position where the third sensor 117 is located in the direction A8 perpendicular to the medium conveying direction for each of the latest first line image and the first line image acquired immediately before. The determination module 172 determines that the medium is included in the latest first line image when the absolute value of the difference between the average value calculated from the latest first line image and the average value calculated from the first line image acquired immediately before is equal to or more than the first threshold value. On the other hand, when the absolute value of the difference is less than the first threshold value, the determination module 172 determines that the medium is included in the latest first line image. The gradation value is a luminance value or a color value (R value, G value or B value). The first threshold value is set to, for example, the difference (e.g., 20) of the gradation values that a person can visually determine the difference in luminance or color on the image.

When the absolute value of the difference between the average values calculated from the first line image and a first reference value is equal to or more than the first threshold value, the determination module 172 may determine that the medium is included in the first line image, and when the absolute value is less than the first threshold value, the determination module 172 may determine that the medium is not included in the first line image. The first reference value when the opposing position is set as the initial setting position is set to the gradation value of the pixel in which the opposing surface 131 is captured by locating the opposing surface 131 in the opposing position, by prior experiments. On the other hand, the first reference value when the non-opposing position is set as the initial setting position is set to the gradation value of the pixel in which the wall member 125 is captured by locating the opposing surface 131 in the non-opposing position, by prior experiments.

Further, the determination module 172, for each pixel corresponding to each other in the latest first line image and the first line image acquired immediately before, may calculate the absolute value of the difference between the gradation values of each pixel, and extract a pixel wherein the absolute value exceeds the first threshold, as a medium pixel corresponding to the medium. The determination module 172 calculates the total number or continuous number of medium pixels extracted from the first line image. When the total number or the continuous number of the medium pixels is equal to or more than the first predetermined number, the determination module 172 determines that the medium is included in the latest first line image, and when the total number or the continuous number of the medium pixels is less than the first predetermined number, the determination module 172 determines that the medium is not included in the latest first line image. The first predetermined number is set to the number of pixels acquired by subtracting a margin from the number of pixels corresponding to the position where the third sensor 117 is located.

Further, the determination module 172, for each pixel in the first line image, may calculate the absolute value of the difference between the gradation value of each pixel and the first reference value, and extract pixel wherein the absolute value exceeds the first threshold, as a medium pixel.

As shown in FIG. 5, the third light emitter 117a and the third light receiver 117b of the third sensor 117 are located at substantially the center in the direction A8 perpendicular to the medium conveying direction. The medium whose front end is detected by the third sensor 117 has passed between the third light emitter 117a and the third light receiver 117b in a direction perpendicular to the medium conveying direction. Therefore, it is likely that the medium is included between the pixel corresponding to the position where the third light emitter 117a is located and the pixel corresponding to the position where the third light receiver 117b is located, in the first line image. Therefore, the determination module 172 can determine whether or not the medium is included in the first line image, in a shorter time and with better accuracy, based on only the gradation values of the pixel corresponding to the position where the third sensor 117 is located, rather than the gradation values of all the pixels in the image.

The determination module 172 may determine whether or not the medium is included in the first line image based on the gradation values of not only the pixels corresponding to the positions where the third sensor 117 is located in the direction A8 perpendicular to the medium conveying direction but also all the pixels. In that case, the first predetermined number is set to, for example, the number of pixels corresponding to the minimum medium size supported by the medium conveying apparatus 100.

Further, the determination module 172 may extract the edge pixels from the first line image when the determination module 172 determines whether or not the medium is included in the first line image based on the gradation values of all the pixels. In that case, the determination module 172 calculates the absolute value (hereinafter, referred to as the adjacent difference value) of the difference between the gradation values of both adjacent pixels in the horizontal direction of each pixel in the first line image, and when the adjacent difference value exceeds the first threshold value, extracts the pixel as an edge pixel. The determination module 172 may calculate the absolute value of the difference between the gradation values of the two pixels separated each other by a predetermined distance in the first line image as the adjacent difference value. Further, the determination module 172 may extract the edge pixel by comparing the gradation value of the line image with the threshold value. For example, when the gradation value of a specific pixel is less than a threshold value and the gradation value of a pixel adjacent to the specific pixel or a pixel separated by a predetermined distance from the specific pixel is equal to or more than a threshold value, the determination module 172 sets the specific pixel as an edge pixel. The determination module 172 identifies the edge pixel located on the leftmost side and the edge pixel located on the rightmost side, among the edge pixels extracted from the first line image, and detects the distance between the specified edge pixels (the number of pixels). The determination module 172 determines that the medium is included in the first line image when the detected distance is equal to or more than a predetermined distance.

When the determination module 172 determines that the medium is included in the first line image, the determination module 172 proceeds the processing to step S215 without executing the processing of step S205 to S214. In this case, the determination module 172 determines that the conveyance abnormality of the medium has not occurred and the conveyance is normal.

On the other hand, when the determination module 172 determines that the medium is not included in the first line image, the determination module 172 determines whether or not the third predetermined time has elapsed after the front end of the medium passes through the position of the third sensor 117 (step S205). The third predetermined time is an example of a predetermined time, and is set to a time acquired by adding a margin to the time required for the front end of the medium to pass through the imaging position L1, L2 of the imaging device 118 after the front end passes through the position of the third sensor 117, by prior experiments. When the third predetermined time has not elapsed after the front end of the medium passes through the position of the third sensor 117, the determination module 172 returns the processing to step S203, and repeats the processing of step S203 to S205. In other words, the image acquisition module 173 acquires a plurality of line images captured without switching the backing member 124 until the third predetermined time has elapsed since the front end of the medium conveyed by the first conveyance roller 115 and the second conveyance roller 116 passes through the position of the third sensor 117. Then, the determination module 172 determines whether or not the medium is included in each of the plurality of line images.

When the third predetermined time has elapsed since the front end of the medium passes through the position of the third sensor 117, the image acquisition module 173 once stops the first motor 151 to stop the feeding and conveying of the medium (step S206).

Next, the image acquisition module 173 drives the second motor 152 to switch the backing member 124 between the opposing position and the non-opposing position (step S207). When the initial setting position of the backing member 124 is the opposing position, the image acquisition module 173 switches the backing member 124 to the non-opposing position. When the initial setting position of the backing member 124 is the non-opposing position, the image acquisition module 173 switches the backing member 124 to the opposing position.

Next, the image acquisition module 173 acquires the second line image from the imaging device 118 (step S208). In other words, the image acquisition module 173 acquires the second line image after the front end of the medium conveyed by the first conveyance roller 115 and the second conveyance roller 116 passes through the position of the third sensor 117. The second line image is a line image captured by locating the opposing surface 131 of the backing member 124 in a position other than the initial setting position among the opposing position or non-opposing position. When the opposing position is set as the initial setting position, the second line image is an example of a second image captured by locating the opposing surface 131 in the non-opposing position. On the other hand, when the non-opposing position is set as the initial setting position, the second line image is an example of a first image captured by locating the opposing surface 131 in the opposing position.

The image acquisition module 173 may cause the imaging device 118 to stop imaging in step S206, and cause the imaging device 118 to image the second line image in step S208. Thus, the image acquisition module 173 can acquire the second line image captured in a status in which the backing member 124 is more reliably switched.

Next, the determination module 172 determines whether or not the medium is included in the second-line image (step S209). The determination module 172 determines whether or not the medium is included in the second line image based on the gradation value of the pixel in the second line image corresponding to the position where the third sensor 117 is located in the direction A8 perpendicular to the medium conveying direction. The determination module 172 calculates an average value of the gradation values of the pixels in the second line image corresponding to the position where the third sensor 117 is located in the direction A8 perpendicular to the medium conveying direction. When the absolute value of the difference between the average value calculated from the second line image and the second reference value is equal to or more than the second threshold value, the determination module 172 determines that the medium is included in the second line image. When the absolute value is less than the second threshold value, the determination module 172 determines that the medium is not included in the second line image. The second reference value when the opposing position is set as the initial setting position, is set to the gradation value of the pixel in which the wall member 125 is captured by locating the opposing surface 131 in the non-opposing position, by prior experiments. On the other hand, the second reference value when the non-opposing position is set as the initial setting position is set to the gradation value of the pixel in which the opposing surface 131 is captured by locating the opposing surface 131 in the opposing position, by prior experiments. The second threshold value, for example, is set to the difference (e.g., 20) of the gradation value that a person can visually determine the difference in luminance or color on the image.

The determination module 172 may determine whether or not the medium is included in the first line image and the second line image by comparing the first line image and the second line image. The determination module 172 calculates the average value of the gradation values of the pixels corresponding to the positions where the third sensor 117 is located in the direction A8 perpendicular to the medium conveying direction for each of the first line image and the second line image. The determination module 172 determines that the medium is included in the first line image and the second line image when the absolute value of the difference between the average value calculated from the first line image and the average value calculated from the second line image is less than the third threshold value. On the other hand, when the absolute value of the difference is equal to or more than the third threshold value, the determination module 172 determines that the medium is not included in the first line image and the second line image. The third threshold value, for example, is set to the difference (e.g., 20) of the gradation value that a person can visually determine the difference in luminance or color on the image.

Further, the determination module 172, for each pixel in the second line image, may calculate the absolute value of the difference between the gradation value of each pixel and the second reference value, and extract pixel of which the absolute value exceeds the second threshold, as a medium pixel. The determination module 172 calculates the total number or continuous number of the medium pixels extracted from the second line image. When the total number or the continuous number of the medium pixels is equal to or more than the second predetermined number, the determination module 172 determines that the medium is included in the second line image. When the total number or the continuous number of the medium pixels is less than the second predetermined number, the determination module 172 determines that the medium is not included in the second line image. The second predetermined number is set to the number of pixels acquired by subtracting a margin from the number of pixels corresponding to the position where the third sensor 117 is located.

Further, the determination module 172, for each pixel corresponding to each other in the first line image and the second line image, may calculate the absolute value of the difference between the gradation values of each pixel, and extract pixel in which the absolute value is less than the third threshold, as a medium pixel. The determination module 172 calculates the total number or continuous number of extracted medium pixels. When the total number or the continuous number of the medium pixels is equal to or more than the second predetermined number, the determination module 172 determines that the medium is included in the first line image and the second line image. When the total number or the continuous number of the medium pixels is less than the second predetermined number, the determination module 172 determines that the medium is not included in the first line image and the second line image.

As described above, the determination module 172 can determine whether or not the medium is included in the second line image, in a shorter time and with better accuracy, based on only the gradation value of the pixel corresponding to the position where the third sensor 117 is located, rather than the gradation value of all the pixels in the image.

The determination module 172 may determine whether or not the medium is included in the second line image based on the gradation values of, not only the pixels corresponding to the positions where the third sensor 117 is located in the direction A8 perpendicular to the medium conveying direction, but also all the pixels. In that case, the second predetermined number is set to, for example, the number of pixels corresponding to the minimum medium size supported by the medium conveying apparatus 100.

Further, the determination module 172 may extract the edge pixels from the second line image when the determination module 172 determines whether or not the medium is included in the second line image, based on the gradation values of all the pixels. In that case, the determination module 172 identifies, among the edge pixels extracted from the second line image, an edge pixel located on the leftmost side and an edge pixel located on the rightmost side, and detects the distance between the specified edge pixels (the number of pixels). The determination module 172 determines that the medium is included in the second line image when the detected distance is equal to or more than a predetermined distance.

When the determination module 172 determines that the medium is not included in the second line image, that is, when the determination module 172 is determined that the medium is not included in both the first line image and the second line image, the determination module 172 determines that the conveyance abnormality such as a conveyance stop due to a jam or a slip of the medium has occurred (step S210).

Next, the control module 171 stops the first motor 151 to stop the feeding and conveying of the medium (step S211), and ends the series of steps.

On the other hand, when the determination module 172 determines that the medium is included in the second image, the image acquisition module 173 drives the second motor 152 to switch the backing member 124 between the opposing position and the non-opposing position (step S212). The image acquisition module 173 returns the backing member 124 to the opposing position when the initial setting position of the backing member 124 is the opposing position. The image acquisition module 173 returns the backing member 124 to the non-opposing position when the initial setting position of the backing member 124 is the non-opposing position.

Next, the determination module 172 sets the determination flag to disable (step S212). Thus, when the determination module 172 determines that the conveyance abnormality of the medium has not occurred based on the first line image and the second line image, the determination module 172 does not determine whether or not a conveyance abnormality of a medium has occurred based on the first line image and the second line image for a medium to be conveyed thereafter. When it is determined that the medium is not included in the first line image, and when a predetermined number or more of the medium pixels are extracted in the first line image and the second line image, it is likely that the color of the medium and the color of the background (the opposing surface 131 or the wall member 125) corresponding to the initial setting position are similar. Further, it is likely that the color of the media collectively placed on the medium tray 103 and conveyed is the same. Therefore, even for the media to be conveyed thereafter, it is likely that it is determined that the medium is not included in the frst line image in the step S204 and that the medium is included in the frst line image and the second line image in the step S209. The determination module 172 does not determine whether or not the conveyance abnormality of the medium has occurred based on the first line image and the second line image for the medium to be conveyed thereafter, and thus it is possible to suppress an increase in the processing time of the medium read processing.

Next, the control module 171 drives the first motor 151 to restart the feeding and conveying of the medium (step S214).

Next, the determination module 172 determines that the conveyance abnormality of the medium has not occurred and the conveyance of the medium is normal (S215 of steps). Thus, the determination module 172 determines whether or not the conveyance abnormality of the medium has occurred based on the first line image and the second line image. When the color of the conveyed medium and the color of the background (opposing surface 131 or wall member 125) corresponding to the initial setting position are similar, the medium may not be correctly detected from the first line image. In this case, even though the conveyance of the medium is normal, the medium conveying apparatus may stop the conveyance of the medium, and cause the user trouble.

The determination module 172 determines whether or not the medium is included for both the first line image and the second line image. When the color of the conveyed medium and the color of the background (opposing surface 131 or wall member 125) corresponding to the initial setting position are similar, the medium may not be correctly detected from the first line image. In that case, since the color of the conveyed medium is different from the color of the background which does not correspond to the initial setting position, it is likely that the medium is correctly detected from the second line image. Since the determination module 172 determines whether or not the conveyance abnormality of the medium has occurred based on both the first line image and the second line image, the determination module 172 can accurately determine whether or not the conveyance abnormality of the medium has occurred.

Also, when the medium is normally conveyed, the medium is included in both the first line image and the second line image. On the other hand, when the conveyance abnormality has occurred and the medium is stopped, no medium is included in both the first line image and the second line image, and the background (the opposing surface 131 or the wall member 125) having different colors from each other is included in the first line image and the second line image. Therefore, when the determination module 172 compares the first line image and the second line image to determine whether the gradation values of the pixels corresponding to each other are similar or different, the determination module 172 can accurately determine whether or not the conveyance abnormality of the medium has occurred.

Further, the determination module 172 determines whether or not the conveyance abnormality of the medium has occurred based on the first line image and the second line image only when the determination module 172 determines that the medium is not included in the plurality of line images in the step S204. Thus, when the color of the conveyed medium and the color of the background (the opposing surface 131 or the wall member 125) corresponding to the initial setting position is different, the determination module 172 can determine that the conveyance of the medium is normal, without switching the backing member 124. Therefore, the determination module 172 can suppress the processing time of the medium reading processing from being unnecessarily increased.

Next, the image acquisition module 173 acquires the first-line image from the imaging device 118 (step S301).

Next, the image acquisition module 173 determines whether or not the entire medium to be conveyed is captured by the imaging device 118 (step S302). The image acquisition module 173 acquires the third medium signal periodically from the third sensor 117, and determines whether or not the medium exists at the position of the third sensor 117 based on the acquired third medium signal. The image acquisition module 173 determines that the rear end of the medium has passed through the position of the third sensor 117 when the signal value of the third medium signal changes from the value indicating existence of a medium to the value indicating nonexistence of a medium. The image acquisition module 173 determines that the entire medium is captured when the fourth predetermined time has elapsed since the image acquisition module 173 determines that the rear end of the medium passed through the position of the third sensor 117. When the entire medium has not yet been captured, the image acquisition module 173 returns the processing to step S301 and repeats the processing of step S301 to S302.

On the other hand, when the entire medium is captured, the image acquisition module 173 generates an input image by synthesizing all of acquired first line images (step S303).

Next, the image acquisition module 173 transmits the input image to the information processing device through the interface device 153 (step S304). When not being connected to the information processing device, the image acquisition module 173 stores the input image in the storage device 160.

Next, the control module 171 determines whether or not the medium remains on the medium tray 103 based on the first medium signal acquired from the first sensor 111 (step S305). When a medium remains on the medium tray 103, the control module 171 returns the processing to step S104 and repeats the processing in steps S104 to S305.

On the other hand, when the medium does not remain on the medium tray 103, the control module 171 stops the first motor 151 (step S306).

Next, the control module 171 sets the determination flag to enable (step S307), and ends the series of steps.

The processing of step S202 may be omitted, and the determination module 172 may determine whether or not the conveyance abnormality of the medium has occurred based on the first line image and the second line image for all the media. Further, the determination module 172 may execute the processing of step S203 to S204 only when the third predetermined time has elapsed since the front end of the medium passes through the position of the third sensor 117. In that case, the determination module 172 determines whether or not the conveyance abnormality of the medium has occurred based on the first line image and the second line image without determining whether or not the medium is included for the plurality of first line images.

In addition, in step S105, S109, S205 and S302, the determination module 172 and the image acquisition module 173 may determine whether or not the first motor 151 has been driven by a predetermined amount corresponding to each predetermined time, instead of determining whether or not the first to fourth predetermined time has elapsed.

As described in detail above, the medium conveying device 100 determines whether or not the medium exists at the position of the imaging device 118 and determines whether or not the conveyance abnormality of the medium has occurred based on the two images captured by switching the backing member 124. Thus, the medium conveying device 100 can more accurately determine whether or not the conveyance abnormality of the medium has occurred.

In particular, the medium conveying apparatus 100 can more accurately detect the conveyance abnormality occurred in front of the imaging device 118. Further, the medium conveying device 100 determine whether or not the conveyance abnormality of the medium has occurred, by simply comparing the gradation values of each pixel of the first line image and the second line image to each other or comparing the gradation values with a reference value, without analyzing the image captured by the imaging device 118 in detail. Thus, the medium conveying device 100 can detect that the conveyance abnormality of the medium has occurred in a short time, to suppress the damage of the medium is increased.

Figure 11:
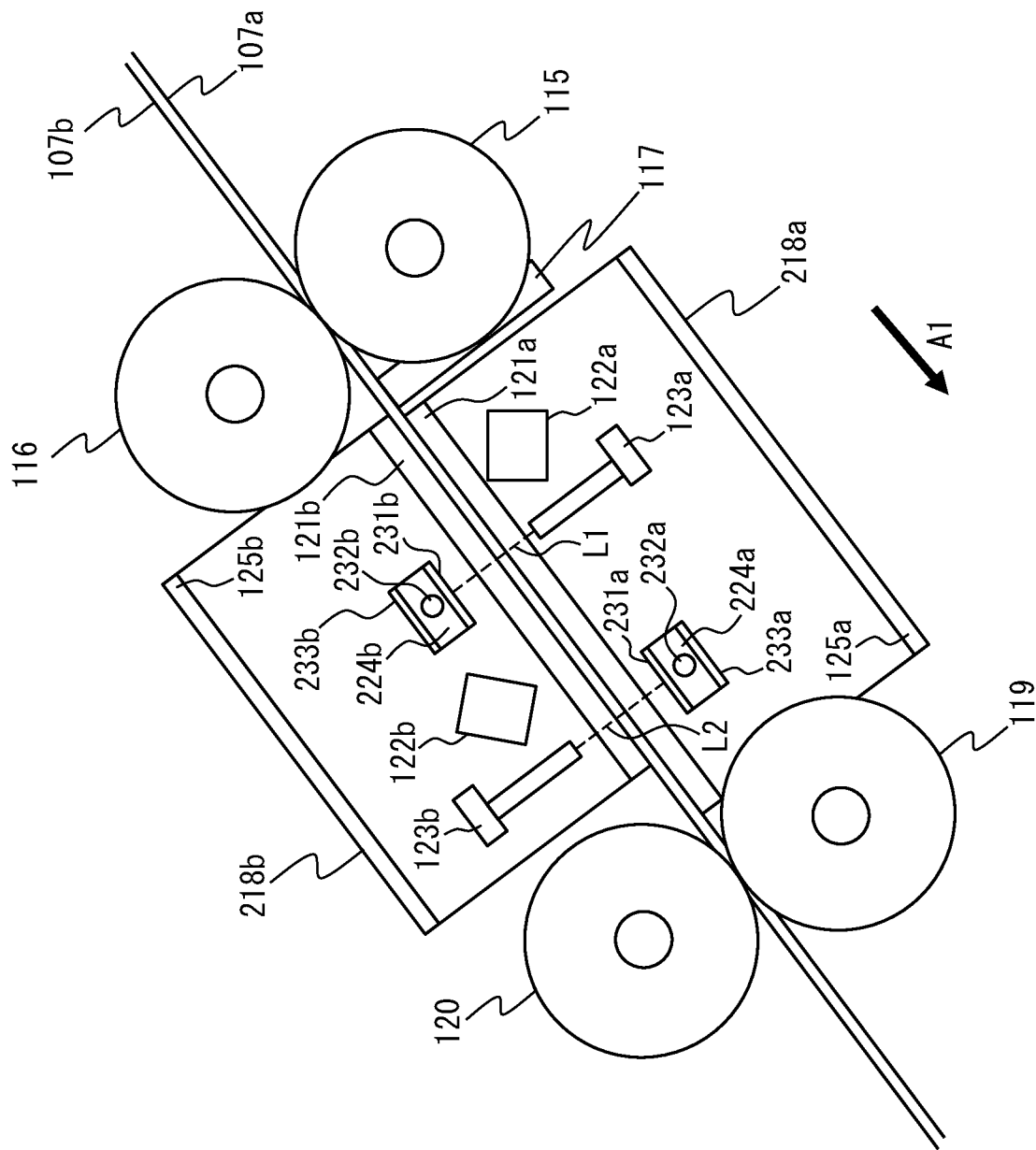
FIG. 11 is a diagram for illustrating another imaging device 218.
Figure 12:
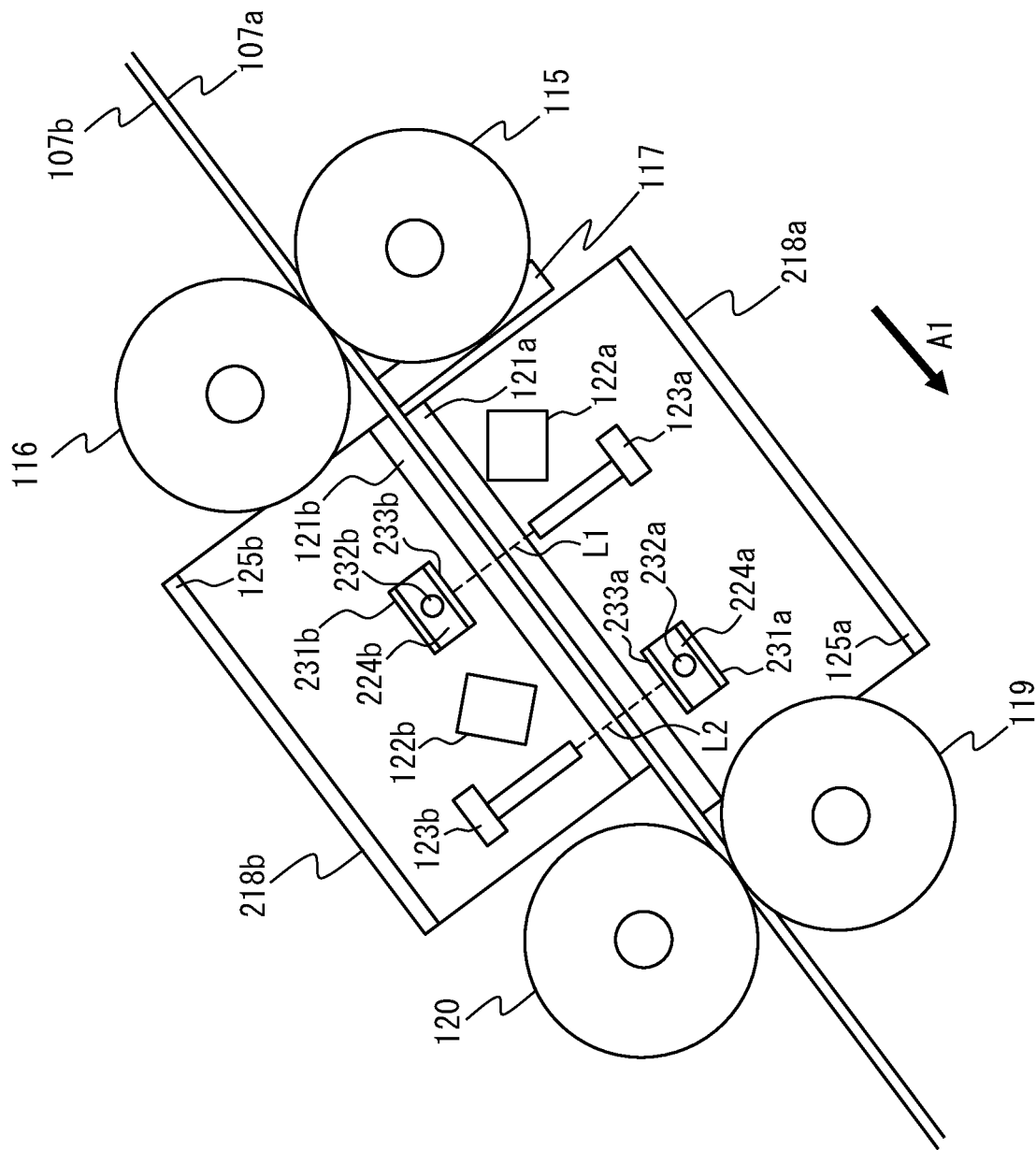
FIG. 12 is a diagram for illustrating another imaging device 218.

FIGS. 11 and 12 are diagrams for illustrating the imaging device 218 in the medium conveying apparatus according to another embodiment.

As shown in FIGS. 11 and 12, the first imaging device 218*a* includes a first backing member 224*a* instead of the first backing member 124*a*, and the second imaging device 218*b* includes a second backing member 224*b* instead of the second backing member 124*b*.

The first backing member 224*a* is provided below the first light transmitting member 121*a* and at a position facing the second light source 122*b* and the second imaging sensor 123*b*. The first backing member 224*a* has a first opposing surface 231*a* facing the second imaging sensor 123*b* and a third opposing surface 233a located on the back surface side of the first opposing surface 231a. The first opposing surface 231a has, for example, white and functions as a white reference member for correcting an image such as shading based on an image signal in which the first opposing surface 231a is captured. The third opposing surface 233a has a color different from that of the first opposing surface 231a such as black. The first backing member 224a is rotatably supported by the first support member 232a by 180°, and is rotated by a driving force from the second motor 152. The first backing member 224a is switched between an opposing position (the position shown in FIG. 11) in which the first opposing surface 231a faces the second imaging sensor 123b and a non-opposing position (the position shown in FIG. 12) in which the first opposing surface 231a deviates from the opposing position. In the non-opposing position, the third opposing surface 233a faces the second imaging sensor 123b.

The second backing member 224b is provided above the second light transmitting member 121b and at a position facing the first light source 122a and the first imaging sensor 123a. The second backing member 224b has a second opposing surface 231b facing the first imaging sensor 123a and a fourth opposing surface 233b located on the back surface side of the second opposing surface 231b. The second opposing surface 231b has, for example, white, functions as a white reference member for correcting an image such as shading based on the image signal in which the second opposing surface 231b is captured. The fourth opposing surface 233b has a color different from that of the second opposing surface 231b such as black. The second backing member 224b is rotatably supported by the second support member 232b by 180°, and is rotated by a driving force from the second motor 152. The second backing member 224b is switched between an opposing position (the position shown in FIG. 11) in which the second opposing surface 231b faces the first imaging sensor 123a and a non-opposing position (the position shown in FIG. 12) in which the second opposing surface 231b deviates from the opposing position. In the non-opposing position, the fourth opposing surface 233b faces the first imaging sensor 123a.

As described in detail above, the medium conveying apparatus can more accurately determine whether or not the conveyance abnormality of the medium has occurred even when using the imaging device 218.

Figure 13:
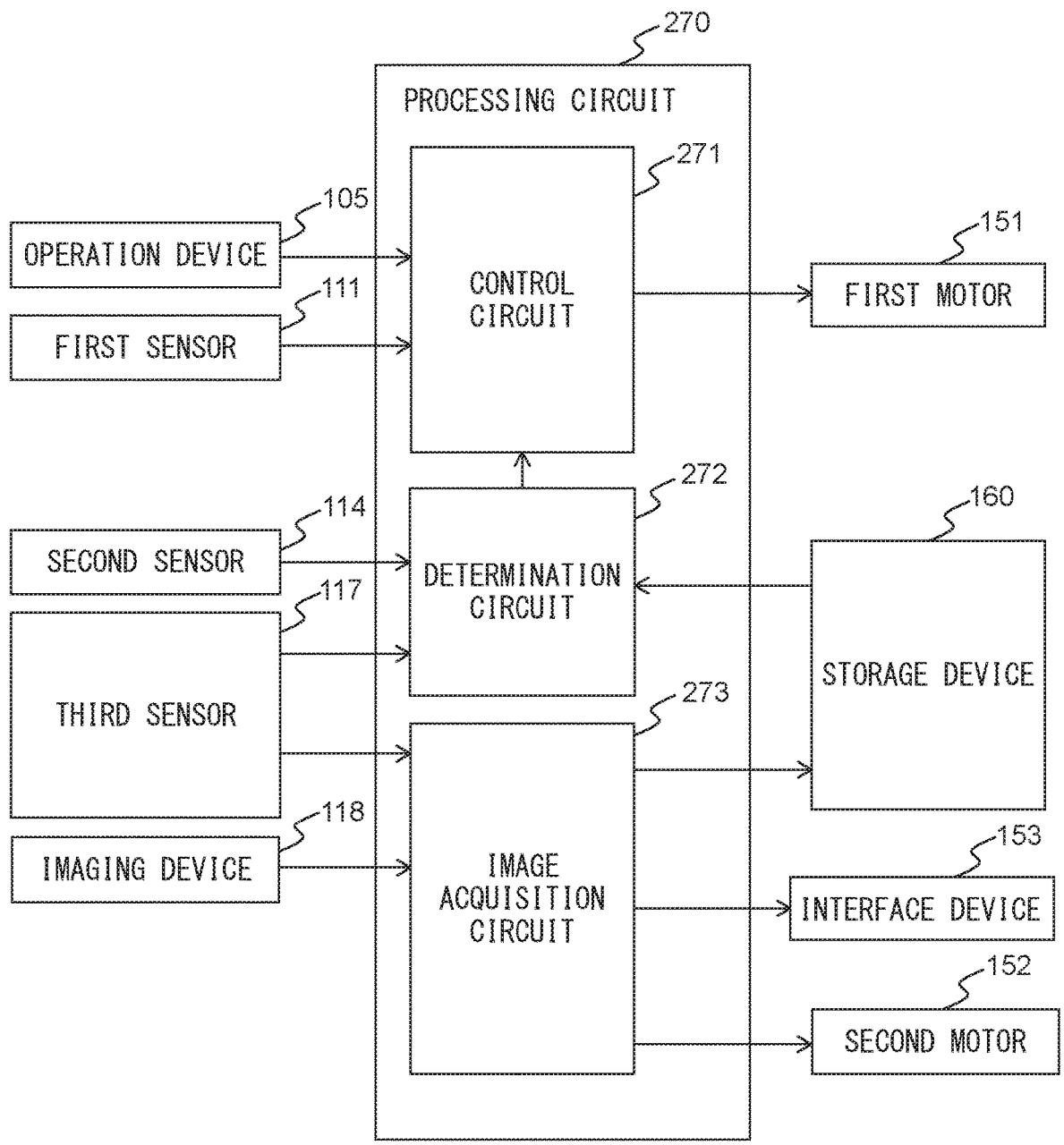
FIG. 13 is a diagram illustrating a schematic configuration of another processing circuit. 270.

FIG. 13 is a diagram illustrating a schematic configuration of a processing circuit 270 in a medium conveying apparatus according to another embodiment. The processing circuit 270 is used in place of the processing circuit 170 of the medium conveying apparatus 100 and executes the medium read processing, etc., instead of the processing circuit 170. The processing circuit 270 includes a control circuit 271, a determination circuit 272 and an image acquisition circuit 273, etc. Note that each unit may be configured by an independent integrated circuit, a microprocessor, firmware, etc.

The control circuit 271 is an example of a control module and has a function similar to the control module 171. The control circuit 271 receives the operation signal from the operation device 105, the first medium signal from the first sensor 111, and a determination result of the conveyance abnormality of the medium from the determination circuit 272. The control circuit 271 drives the first motor 151 in response to the received signals, and stops the first motor 151 when the conveyance abnormality of the medium is detected.

The determination circuit 272 is an example of a determination module has a functions similar to the determination module 172. The determination circuit 272 receives the second medium signal from the second sensor 114, the third medium signal from the third sensor 117, the first line image and the second line image from the storage device 160. The determination circuit 272 determines whether or not the conveyance abnormality of the medium has occurred based on the received signals and images, and outputs the determination result to the control circuit 271.

The image acquisition circuit. 273 is an example of an image acquisition module and has a function similar to the image acquisition module 173. The image acquisition circuit 273 drives the second motor 152 and receives the third medium signal from the third sensor 117, the first line image and the second line image from the imaging device 118. The image acquisition circuit 273 stores the first line image and the second line image in the storage device 160, generates the input image from the first line image, and transmits the input image to the information processing apparatus via the interface device 153.

As described in detail above, the medium conveying apparatus can more accurately determine whether or not the conveyance abnormality of the medium has occurred even when using the processing circuit 270.

According to the embodiment, the medium conveying apparatus, the method, and the computer-readable, non-transitory medium storing the control program, can more accurately determine whether or not the conveyance abnormality of the medium has occurred.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   a conveyance roller to convey a medium;
   an imaging sensor;
   a backing member including an opposing surface;
   a motor to switch the backing member between an opposing position in which the opposing surface faces the imaging sensor and a non-opposing position in which the opposing surface is deviated from the opposing position;
   a medium sensor located on an upstream side of the imaging sensor in a medium conveying direction; and
   a processor to
      acquire a first image captured by locating the opposing surface in the opposing position and a second image captured by locating the opposing surface in the non-opposing position after a front end of the medium conveyed by the conveyance roller passes through a position of the medium sensor, and
      determine whether a conveyance abnormality of the medium has occurred based on the first image and the second image.

2. The medium conveying apparatus according to claim 1, wherein
   the processor acquires a plurality of line images captured without switching the backing member until a predetermined time has elapsed since the front end of the medium conveyed by the conveyance roller passes through the position of the medium sensor, and determines whether the medium is included in the plurality of line images, and determines whether the conveyance abnormality of the medium has occurred based on the first image and the second image only when the processor determines that the medium is not included in the plurality of line images.

3. The medium conveying apparatus according to claim 2, wherein when the processor determines that the conveyance abnormality of the medium has not occurred based on the first image and the second image, the processor does not determine whether a conveyance abnormality of a medium has occurred for a medium to be conveyed thereafter.

4. The medium conveying apparatus according to claim 1, wherein the processor determines whether the conveyance abnormality of the medium has occurred based on gradation values of pixels corresponding to a position where the medium sensor is located in a direction perpendicular to the medium conveying direction in the first image and the second image.

5. A method for controlling conveying a medium, comprising:

conveying a medium by a conveyance roller;

switching a backing member including an opposing surface between the opposing position in which the opposing surface faces an imaging sensor and a non-opposing position in which the opposing surface is deviated from the opposing position by a motor;

acquiring a first image captured by locating the opposing surface in the opposing position and a second image captured by locating the opposing surface in the non-opposing position after a front end of the medium conveyed by the conveyance roller passes through a position of a medium sensor located on an upstream side of the imaging sensor in a medium conveying direction, and determining whether a conveyance abnormality of the medium has occurred based on the first image and the second image.

6. The method according to claim 5, wherein a plurality of line images captured is acquired without switching the backing member until a predetermined time has elapsed since the front end of the medium conveyed by the conveyance roller passes through the position of the medium sensor, and wherein whether the medium is included in the plurality of line images is determined, and whether the conveyance abnormality of the medium has occurred is determined based on the first image and the second image only when it is determined that the medium is not included in the plurality of line images.

7. The method according to claim 6, wherein when it is determined that the conveyance abnormality of the medium has not occurred based on the first image and the second image, whether a conveyance abnormality of a medium has occurred is not determined for a medium to be conveyed thereafter.

8. The method according to claim 5, wherein whether the conveyance abnormality of the medium has occurred is determined based on gradation values of pixels corresponding to a position where the medium sensor is located in a direction perpendicular to the medium conveying direction in the first image and the second image.

9. A computer-readable, non-transitory medium storing a computer program, wherein the computer program causes a medium conveying apparatus including a conveyance roller to convey a medium, an imaging sensor, a backing member including an opposing surface, a motor to switch the backing member between an opposing position in which the opposing surface faces the imaging sensor and a non-opposing position in which the opposing surface is deviated from the opposing position, a medium sensor located on an upstream side of the imaging sensor in a medium conveying direction, to execute a process, the process comprising:

acquiring a first image captured by locating the opposing surface in the opposing position and a second image captured by locating the opposing surface in the non-opposing position after a front end of the medium conveyed by the conveyance roller passes through a position of the medium sensor; and determining whether a conveyance abnormality of the medium has occurred based on the first image and the second image.

10. The computer-readable, non-transitory medium according to claim 9, wherein a plurality of line images captured is acquired without switching the backing member until a predetermined time has elapsed since the front end of the medium conveyed by the conveyance roller passes through the position of the medium sensor, and wherein whether the medium is included in the plurality of line images is determined, and whether the conveyance abnormality of the medium has occurred is determined based on the first image and the second image only when it is determined that the medium is not included in the plurality of line images.

11. The computer-readable, non-transitory medium according to claim 10, wherein when it is determined that the conveyance abnormality of the medium has not occurred based on the first image and the second image, whether a conveyance abnormality of a medium has occurred is not determined for a medium to be conveyed thereafter.

12. The computer-readable, non-transitory medium according to claim 9, wherein whether the conveyance abnormality of the medium has occurred is determined based on gradation values of pixels corresponding to a position where the medium sensor is located in a direction perpendicular to the medium conveying direction in the first image and the second image.

* * * * *